United States Patent
Chang

(10) Patent No.: US 8,306,325 B2
(45) Date of Patent: Nov. 6, 2012

(54) TEXT CHARACTER IDENTIFICATION SYSTEM AND METHOD THEREOF

(75) Inventor: Hao-Wei Chang, Kaohsiung (TW)

(73) Assignee: Yoshinaga Technologies, LLC, Wilmington, DE (US)

( * ) Notice: Subject to any disclaimer, the term of this patent is extended or adjusted under 35 U.S.C. 154(b) by 387 days.

(21) Appl. No.: 11/142,846

(22) Filed: Jun. 1, 2005

(65) Prior Publication Data

US 2005/0271275 A1    Dec. 8, 2005

(30) Foreign Application Priority Data

Jun. 4, 2004 (TW) .............................. 93116117 A

(51) Int. Cl.
*G06K 9/34* (2006.01)

(52) U.S. Cl. ........ 382/176; 382/177; 382/164; 382/167; 382/173; 358/62; 358/462; 358/446; 358/1.9; 358/466; 358/456; 358/458; 705/500; 705/530; 705/517; 705/518; 705/520

(58) Field of Classification Search .......... 382/176–177, 382/164, 167, 173, 274, 288–291; 358/62, 358/464, 462, 446, 1.9, 466, 465, 456, 458; 705/500, 530, 517, 518, 519, 520, 521
See application file for complete search history.

(56) References Cited

U.S. PATENT DOCUMENTS

| | | | | |
|---|---|---|---|---|
| 5,390,259 A | * | 2/1995 | Withgott et al. | 382/173 |
| 5,410,611 A | * | 4/1995 | Huttenlocher et al. | 382/177 |
| 5,680,478 A | * | 10/1997 | Wang et al. | 382/176 |
| 5,892,843 A | * | 4/1999 | Zhou et al. | 382/176 |
| 5,953,451 A | * | 9/1999 | Syeda-Mahmood | 382/187 |
| 5,974,177 A | * | 10/1999 | Krtolica | 382/202 |
| 6,006,226 A | * | 12/1999 | Cullen et al. | 382/232 |
| 6,266,156 B1 | * | 7/2001 | Tanimura et al. | 358/1.9 |
| 6,360,002 B2 | * | 3/2002 | Kim et al. | 382/103 |
| 6,507,670 B1 | * | 1/2003 | Moed | 382/172 |
| 6,519,362 B1 | * | 2/2003 | Cusmariu | 382/176 |
| 6,574,375 B1 | | 6/2003 | Cullen et al. | 382/290 |
| 6,633,411 B1 | * | 10/2003 | Rao et al. | 358/2.1 |
| 6,757,081 B1 | * | 6/2004 | Fan et al. | 358/474 |
| 6,778,296 B1 | * | 8/2004 | Yang | 358/1.9 |
| 6,788,308 B2 | * | 9/2004 | Reavy et al. | 345/617 |
| 6,798,895 B1 | * | 9/2004 | Takahashi | 382/101 |
| 6,826,305 B2 | * | 11/2004 | Zhu | 382/172 |
| 6,961,460 B2 | * | 11/2005 | Nagai et al. | 382/162 |
| 7,031,553 B2 | * | 4/2006 | Myers et al. | 382/289 |
| 7,188,307 B2 | * | 3/2007 | Ohsawa | 715/205 |
| 7,379,594 B2 | * | 5/2008 | Ferman et al. | 382/176 |
| 7,616,813 B2 | * | 11/2009 | Nishida | 382/173 |

(Continued)

OTHER PUBLICATIONS

Keechul Jung , JungHyun Han "Hybrid approach to efficient text extraction in complex color images" Pattern Recognition Letters 25 (2004), p. 679-699.*

(Continued)

*Primary Examiner* — Matthew Bella
*Assistant Examiner* — Mekonen Bekele
(74) *Attorney, Agent, or Firm* — Perkins Coie LLP

(57) ABSTRACT

A method for text character identification. The method acquires multiple connected components (CCs) in a binary image, and each CC has a pattern property value. The method determines at least one property limit based on the pattern property values, generates a filtering rule according to the property limit, and determines whether each of the CCs is a text character according to the filtering rule.

24 Claims, 6 Drawing Sheets

U.S. PATENT DOCUMENTS

2001/0043742 A1* 11/2001 Melen ............................. 382/203
2004/0066538 A1* 4/2004 Rozzi .............................. 358/2.1

OTHER PUBLICATIONS

Keechul Jung , Kwang in Kim, Anil K. Jain "Text information extraction in images and video: a survey" Pattern Recognition 37 (2004), p. 977-997.*

Fan Jiulun , Xie Winxin "Minimum error thresholding: A note" Pattern Recognition Letters 18 (1997) p. 705-709.*

Keechul Jung, Kwang in Kim, Anil K. Jain "Text information extraction in images and video: a survey" Pattern Recognition 37 (2004), p. 977-999.*

Fan Jiulun, Xie Winxin "Minimum error thresholding: A note" Pattern Recognition Letters 18 (1997) p. 705-709.*

Keechul Jung, JungHyun Han "Hybrid approach to efficient text extraction in complex color images" Pattern Recognition Letters 25 (2004), p. 679-699.*

* cited by examiner

TEXT CHARACTER IDENTIFICATION SYSTEM AND METHOD THEREOF

BACKGROUND

The present invention relates to a bitmap image processing technology, and more particularly, to a system and method thereof for text character identification.

A bitmap image is a map or organized array of pixels of bit-based information, often mapped at hundreds of pixels per inch. For example, a bitmap image with a resolution of 300 pixels per inch in an image that is 3 inches by 2 inches produces 900 pixels by 600 pixels for 540000 pixels total.

The bitmap image contains three types of image, black and white, grayscale, and RGB. A black and white bitmap image at least contains information for each pixel. A bit to a computer has only one value, 0 or 1, "yes" or "no", and for a black and white bitmap image, black or white. Using the binary counting method, a grayscale bitmap (black to white) has a color depth of 256. Each pixel is represented as having one of 256 different grays (values), including black and white. A RGB bitmap image has a color depth of 16.77 million colors, 256×256×256. Each pixel has information for each of the 3 RGB colors. Each pixel in the bitmap array describes a layer of one of 256 values for red, one of 256 values for green and one of 256 values for blue.

Image processing systems/methods for reflective scanners, photocopiers, facsimile machines or digital cameras have been used in a variety of processes for digitalizing original documents into machine-readable versions (i.e., a bitmap image). The bitmap image usually comprises text, graphics or others. Extracting text from a bitmap image where the text is integrated with graphics is useful for optical character recognition (OCR), information retrieval (IR) or printing.

Two types of text extraction algorithms, such as a bottom-up approach and a top-down approach, have been developed. In the bottom-up approach, text regions are constructed by an agglomeration process that merges pixels to regions when those pixels are both adjacent to the regions and similar in property (most simply intensity). Each pixel in the bitmap image receives a label from the region growing process; pixels will have the same label if and only if they belong to the same region. In the top-down approach, text regions are constructed by recursively segmenting a whole or a portion of a bitmap image into smaller divisions, classifying some of the divisions into text regions or graphic regions, and re-segmenting the remaining divisions until sufficient text and graphics are classified.

The conventional extraction methods entail several limitations, particularly reduced accuracy. In addition, accuracy reduction is often caused by characteristics of an original document, such as variations of text size, text color, background images, languages, or oblique images. For example, in U.S. Pat. No. 6,519,362, "METHOD OF EXTRACTING TEXT PRESENT IN A COLOR IMAGE," method of extracting text from a color image by performing one to five conversion methods to maximize the contrast between any text in the image and the rest of the image is disclosed. The above method fails to correctly extract text when the color of the text is near to that of the background. U.S. Pat. No. 6,574,375, entitled "METHOD OF DETECTING INVERTED TEXT IMAGES ON A DIGITAL SCANNING DEVICE," discloses a method of extracting text based on predetermined parameters at 300 dpi resolution. The predetermined parameters are automatically adjusted according to variation of the resolution of the image to provide improved extraction accuracy. The resolution, however, may be independent from some of the predetermined parameters, i.e., a lower resolution image may not absolutely contain a smaller size of text than a higher resolution image, and thus, the above adjustment may cause an incorrect result. In view of these limitations, a need exists for a system and method of text character identification with improved accuracy.

SUMMARY

An embodiment of the present invention further discloses a text character identification method utilized to identify text characters in a binary image. The method acquires multiple connected components (CCs) in a binary image, and each CC has a pattern property value. The method determines at least one property limit based on the pattern property values, generates a filtering rule according to the property limit, and determines whether each of the CCs is a text character according to the filtering rule.

An embodiment of the invention additionally discloses a computer-readable storage medium for a computer program providing the disclosed method of text character identification.

An embodiment of the invention discloses a text character identification system utilized to identify text characters in a binary image. The image correction system comprises a connected component acquisition unit, a limit generation unit, a filtering rule generation unit and a text determination unit. The connected component acquisition unit acquires multiple CCs in a binary image, each CC having a pattern property value. The limit generation unit configured to determine at least one property limit based on the pattern property values. The filtering rule generation unit generates a filtering rule according to the property limit. The text determination unit determines whether each of the CCs is a text character according to the filtering rule.

BRIEF DESCRIPTION OF THE DRAWINGS

Embodiments of the present invention can be more fully understood by reading the subsequent detailed description and examples of embodiments thereof with reference made to the accompanying drawings, wherein.

DETAILED DESCRIPTION

Figure 1:
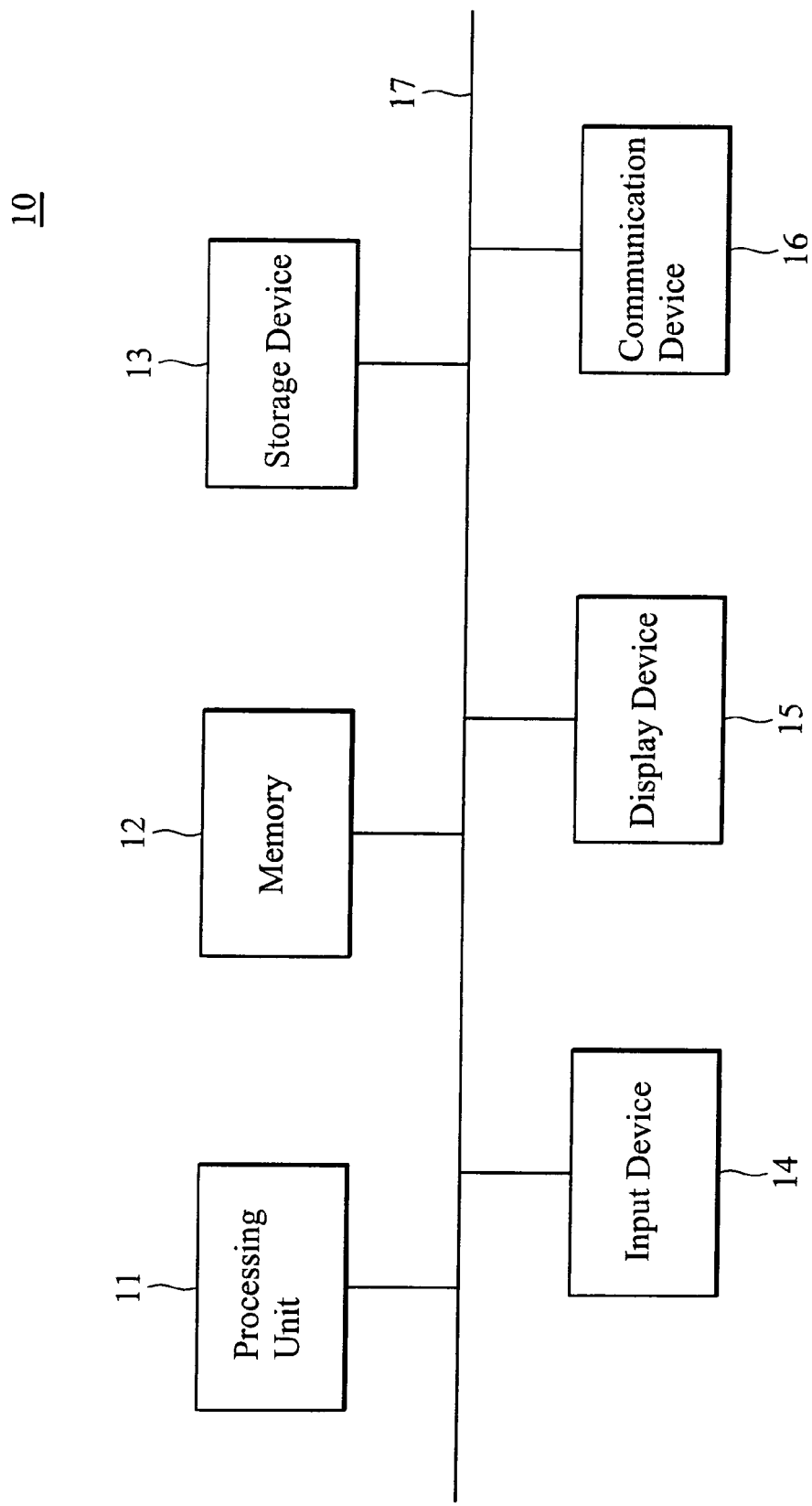
FIG. 1 is a diagram of the hardware environment according to embodiments of the invention.

FIG. 1 is a diagram of the hardware environment according to embodiments of the invention. The description of FIG. 1 is provides a brief, general description of suitable computer hardware in conjunction with which embodiments of the invention may be implemented. An embodiment of a text character identification system 10 comprises a processing unit 11, a memory 12, a storage device 13, an input device 14, a display device 15 and a communication device 16. Moreover, those skilled in the art will appreciate that embodiments of the invention may be practiced with other computer system configurations, including hand-held devices, multiprocessor-based, microprocessor-based or programmable consumer electronics, network PC's, minicomputers, mainframe computers, and the like. There may be one or more processing units 11, such that the processor of the computer 10 comprises a single central processing unit (CPU), or multiple processing units, commonly referred to as a parallel processing environment. The memory 12 is preferably a random access memory (RAM), but may also include read-only memory (ROM) or flash ROM, and stores program modules loaded and executed by the processing unit 11. Generally, the program modules comprise routines, scripts, programs, objects, components or others to execute text character identification functions. Embodiments of the invention may also be practiced in distributed computing environments where tasks are performed by remote processing devices linked through a communication network. In a distributed computing environment, program modules may be located in both local and remote memory storage devices. The storage device 13 may be a hard disk drive reading from and writing to a hard disk, a magnetic disk drive reading from and writing to a magnetic disk or an optical disk drive reading from or writing to a removable optical disk. The drives and their associated computer-readable media provide nonvolatile storage of computer-readable instructions, data structures, program modules and other data for the computer 10.

Figure 2:
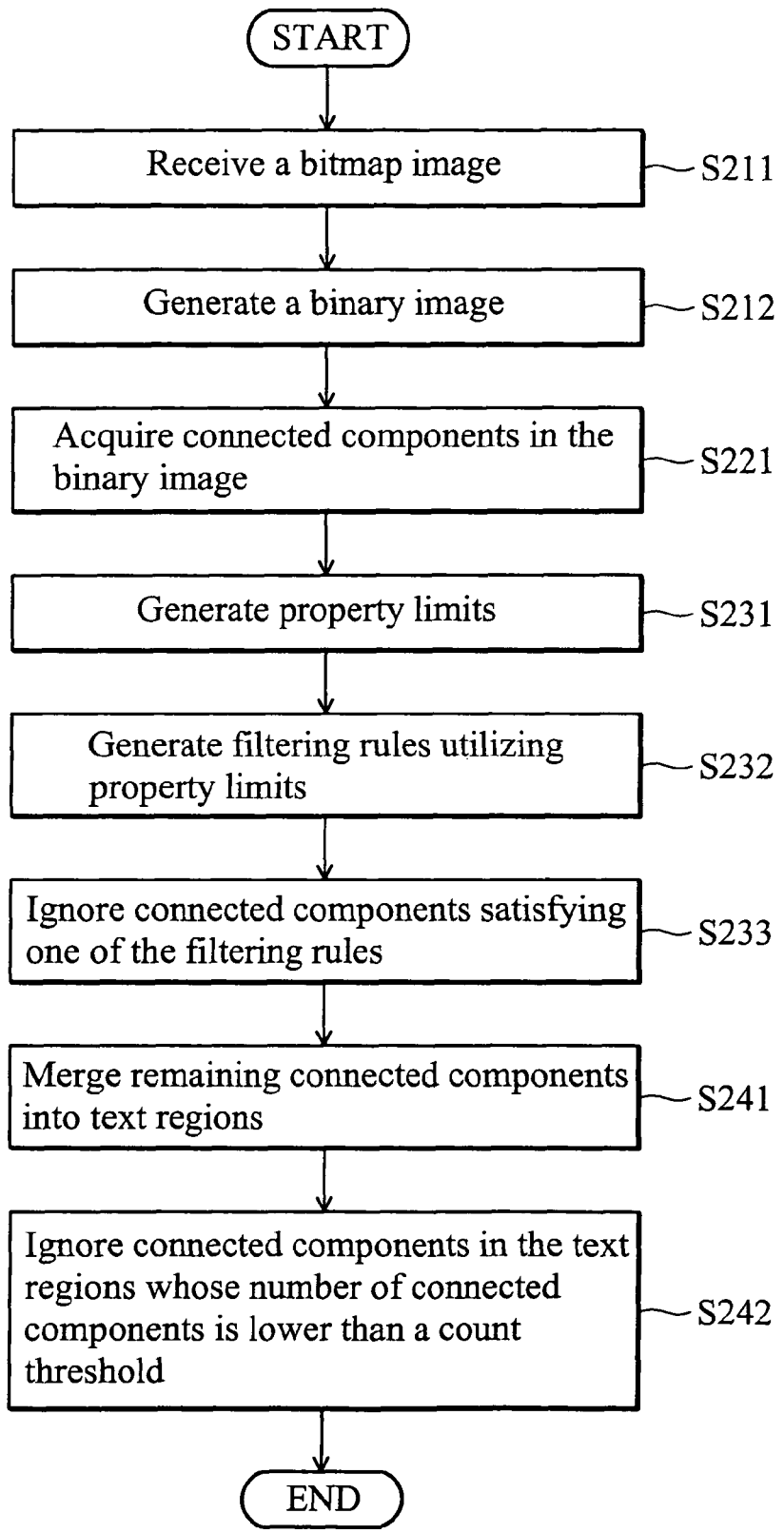
FIG. 2 shows a method of the text character identification according to embodiments of the invention.
Figure 3:
FIG. 3 is a diagram of a bitmap image comprising texts integrated with graphics.

FIG. 2 shows a method of the text character identification according to embodiments of the invention. In step S211, a bitmap image, such as a grayscale bitmap image, a RGB bitmap image, or bitmap images with other color formats, comprising pixels, is received. FIG. 3 is a diagram of a bitmap image comprising texts integrated with graphics. In step S212, the bitmap image is converted into a binary image using a thresholding method, such as a minimum error thresholding method, Otsu thresholding method and the like. It is noted that the usage of the thresholding method is well known in the art and as such is only described briefly herein.

Figure 4:
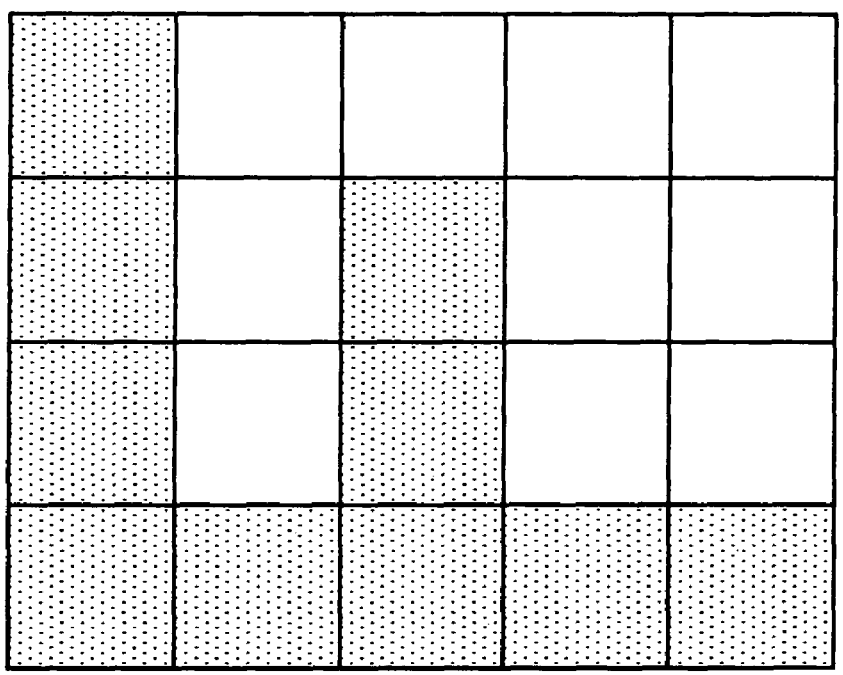
FIG. 4 is a diagram of a connected component.

In step S221, connected components (CCs) in the binary image are acquired using a region growing method. CCs are constructed by merging pixels to CCs when those pixels are both adjacent to the CCs and similar in property. Each pixel in the bitmap image receives a CC label from the region growing method; pixels will have the same CC label if and only if they belong to the same CC. It is noted that the usage of the region growing method is well known in the art and as such is only described briefly herein. FIG. 4 is a diagram of a connected component. The height, width and density of the CC of FIG. 4 are respectively 5, 4 and 10/20=0.5.

In step 231, upper and lower limits of pattern properties, e.g., CC height, CC width and CC density, are calculated. In one example, a base width, which is a CC width being the most frequently occurring in the binary image, is acquired, and upper and lower width limits are acquired by respectively multiplying/adding a weighted value by/to the base width, and dividing/subtracting the same or another weighted value into/from the base width. Preferably, the upper width limit is calculated by multiplying 5 by the base width, and the lower width limit is calculated by dividing 3 into the base width. In another example, a base height, which is a CC height being the most frequently occurring in the binary image, is acquired, and upper and lower height limits are acquired by respectively multiplying/adding a weighted value by/to the base height, and dividing/subtracting the same or another weighted value into/from the base height. Preferably, the upper height limit is calculated by multiplying 5 by the base height, and the lower height limit is calculated by dividing 3 into the base height. In the other example, upper and lower density limits are acquired. Preferably, the upper and lower density limits are respectively set to 0.9 and 0.1.

In step S232, filtering rules utilizing some of the upper and lower limits of pattern properties are generated. In an example, a filtering rule defines that a CC is not a text character if its height is lower than the lower height limit and its width is lower than the lower width limit. In another example, a filtering rule defines that a CC is not a text character if its height is higher than the upper height limit or its width is higher than the upper width limit. In another example, a filtering rule defines that a CC is not a text character if its density is higher than the upper density limit or its density is lower than the lower density limit.

In step S233, all CCs in the binary image are sequentially detected and those CCs not satisfying all of the filtering rules are labeled as a potential text character. In an example, each CC not satisfying all of the filtering rules receives a text character label representing CC is a potential text character.

In step S241, neighboring CCs are merged into text regions. Each CC receives a text region label; CCs will have the same text region label only if they belong to the same text region. The neighboring determination of each of the two CCs can be achieved by detecting distances between two CCs or number of pixels.

In step S242, all text regions are sequentially detected and those text regions whose number of text characters is lower than a fifth threshold are removed. In an example, text region labels belong to those text regions wherein the number of text characters being lower than a count threshold, are set to null, indicating the text regions are disabled.

Figure 5:
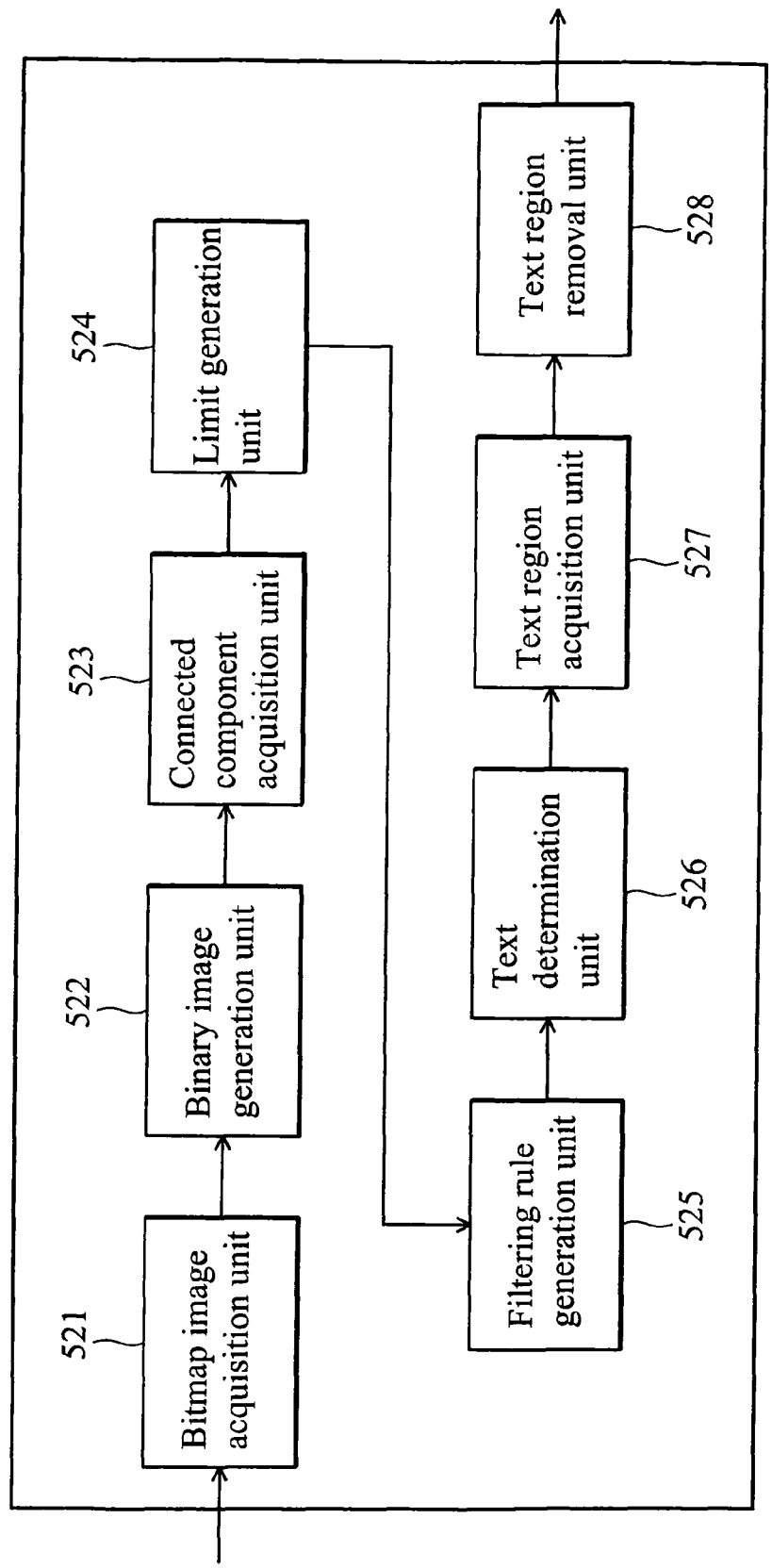
FIG. 5 shows a system of the text character identification according to embodiments of the invention.

FIG. 5 shows a system of the text character identification according to embodiments of the invention. The system executed by the processing unit 11 comprises a bitmap image acquisition unit 521, a binary image generation unit 522, a CC acquisition unit 523, a limit generation unit 524, a filtering rule generation unit 525, a text determination unit 526, a text region acquisition unit 527 and a text region removal unit 528.

The bitmap image acquisition unit 521 receives a bitmap image, such as a grayscale bitmap image, a RGB bitmap image, or a bitmap image with other color formats, comprising pixels. The bitmap image typically comprises text integrated with graphics.

The binary image generation unit 522 converts the bitmap image into a binary image using a thresholding method, such as a minimum error thresholding method, Otsu thresholding method and the like.

The CC acquisition unit 523 acquires CCs in the binary image using a region growing method. CCs are constructed by merging pixels to CCs when those pixels are both adjacent to the CCs and similar in property. Each pixel in the bitmap image receives a CC label from the region growing method; pixels will have the same CC label only if they belong to the same CC.

The limit generation unit 524 calculates upper and lower limits of pattern properties, e.g., CC height, CC width and CC density. In one example, a base width, which is a CC width being the most frequently occurring in the binary image, is acquired, and upper and lower width limits are acquired by respectively multiplying/adding a weighted value by/to the base width, and dividing/subtracting the same or another weighted value into/from the base width. Preferably, the upper width limit is calculated by multiplying 5 by the base width, and the lower width limit is calculated by dividing 3 into the base width. In another example, a base height, which is a CC height being the most frequently occurring in the binary image, is acquired, and upper and lower height limits are acquired by respectively multiplying/adding a weighted value by/to the base height, and dividing/subtracting the same or another weighted value into/from the base height. Preferably, the upper height limit is calculated by multiplying 5 by the base height, and the lower height limit is calculated by dividing 3 into the base height. In the other example, upper and lower density limits are acquired. Preferably, the upper and lower density limits are respectively set to 0.9 and 0.1.

The filtering rule generation unit 525 generates filtering rules utilizing some of the upper and lower limits of pattern properties. In one example, a filtering rule defines that a CC is not a text character if its height is lower than the lower height limit and its width is below the lower width limit. In another example, a filtering rule defines that a CC is not a text character if its height is higher than the upper height limit or its width is higher than the upper width limit. In another example, a filtering rule defines that a CC is not a text character if its density is higher than the upper density limit or its density is lower than the lower density limit.

The text determination unit 526 sequentially detects all CCs in the binary image and labels a potential text character to those CCs not satisfying all of the filtering rules. In one example, each CC not satisfying all of the filtering rules receives a text character label representing CC is a potential text character.

The text region acquisition unit 527 merges neighboring CCs into text regions. Each CC receives a text region label; CCs will have the same text region label if and only if they belong to the same text region. The neighboring determination of each of the two CCs can be achieved by detecting distances between two CCs or number of pixels.

The text region removal unit 528 sequentially detects all text regions and removes those text regions whose number of text characters is lower than a count threshold. In one example, text region labels belong to those text regions wherein the number of text characters being lower than a count threshold, are set to null, indicating the text regions are disabled.

Figure 6:
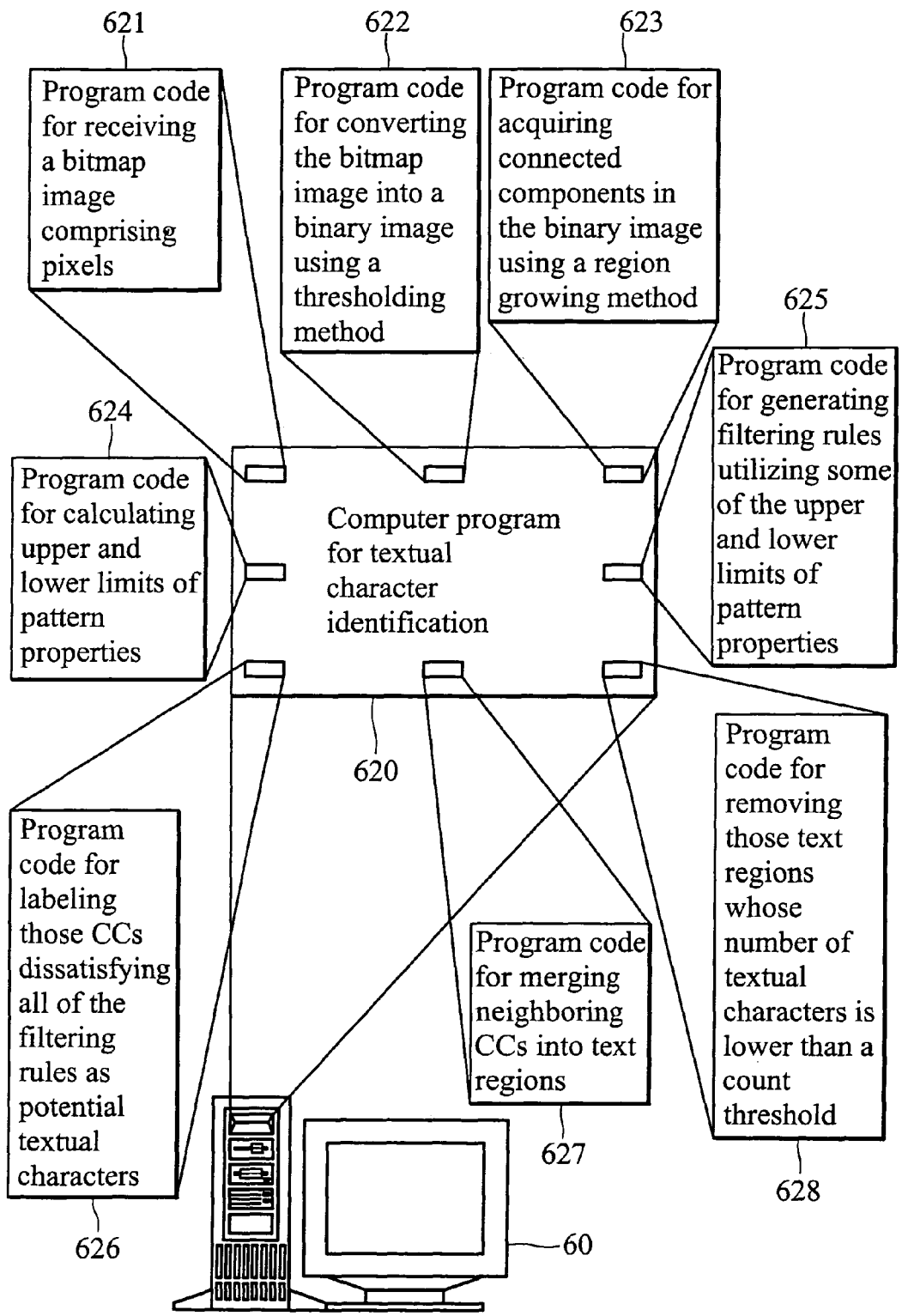
FIG. 6 is a diagram of a storage medium for a computer program providing the method of text character identification according to embodiments of the invention.

A storage medium as shown in FIG. 6 is also disclosed, storing a computer program 620 providing a method of text character identification. The computer program product comprises a storage medium 60 having computer readable program code embodied in the medium for use in a computer system, the computer readable program code comprising at least computer readable program code 621 receiving a bitmap image comprising pixels, computer readable program code 622 converting the bitmap image into a binary image using a thresholding method, computer readable program code 623 acquiring CCs in the binary image using a region growing method, computer readable program code 624 calculating upper and lower limits of pattern properties, computer readable program code 625 generating filtering rules utilizing some of the upper and lower limits of pattern properties, computer readable program code 626 labeling those CCs not satisfying all of the filtering rules as potential text characters, computer readable program code 627 merging neighboring CCs into text regions, and computer readable program code 628 removing those text regions whose number of text characters is lower than a count threshold.

Methods and systems of embodiments of the invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the present invention has been described in preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A non-transitory computer-readable storage medium having stored thereon computer-executable instructions that, if executed by a computing device, cause the computing device to perform operations comprising:
    acquiring a plurality of connected components (CCs) in a binary image;
    determining a property limit by acquiring at least one of a most frequently occurring CC base height and a most frequently occurring CC base width in the binary image;
    generating a filtering rule according to the property limit;
    determining that a first plurality of CCs are text characters according to the filtering rule, and adjacency to a CC that has previously been determined to be text characters;
    assigning a first text label to the first plurality of CCs;
    determining that a second plurality of CCs are not text characters according to the filtering rule, or because individual CCs are not adjacent to an individual CC that has previously been determined to be a text character;
    assigning a second text label to the second plurality of CCs;
    merging neighboring CCs into a plurality of text regions; and
    determining that the CCs in any text region are not text characters if there are fewer than a predetermined number of CCs within the text region.

2. The non-transitory computer-readable storage medium of claim 1, wherein the operations further comprise converting a bitmap image to the binary image using a thresholding method.

3. The non-transitory computer-readable storage medium of claim 2 wherein the thresholding method comprises a minimum error thresholding method or Otsu thresholding method.

4. The non-transitory computer-readable storage medium of claim 1 wherein acquiring a plurality of CCs comprises using a region growing method.

5. The non-transitory computer-readable storage medium of claim 4 wherein the region growing method comprises merging pixels to CCs when those pixels are both adjacent to the CCs and similar in property.

6. The non-transitory computer-readable storage medium of claim 1 wherein determining a property limit further comprises determining a CC density.

7. The non-transitory computer-readable storage medium of claim 5 wherein the property limit comprises an upper height limit, an upper width limit, an upper density limit, a lower height limit, a lower width limit and a lower density limit, and wherein determining the property limit further comprises:

determining the upper and lower height limits either by multiplying a first weighted value by the base height or by adding a first weighted value to the base height;

determining the lower height limit either by dividing the base height by a second height value or by subtracting a second weighted value from the base height;

determining an upper width limit either by multiplying a third weighted value by the base width or by adding the third weighted value to the base width;

determining a lower width limit either by dividing the base width by a fourth weighted value or by subtracting the fourth weighted value from the base width; and acquiring upper and lower density limits.

8. The non-transitory computer-readable storage medium of claim 7 wherein the filtering rule comprises:

determining that one of the CCs is not a text character if its height is lower than the lower height limit and its width is lower than the lower width limit;

determining that one of the CCs is not a text character if its height is higher than the upper height limit or its width is higher than the upper width limit; and determining that one of the CCs is not a text character if its density is higher than the upper density limit or its density is lower than the lower density limit.

9. A method in a computing device having a memory and a processor, the method comprising:

acquiring a plurality of connected components (CCs) in a binary image;

determining with the computing device a property limit by acquiring at least one of a most frequently occurring CC base height in the binary image and a most frequently occurring CC base width in the binary image;

generating with the computing device a filtering rule according to the property limit;

determining that a first CC is a text CC if the first CC both satisfies the filtering rule, and is adjacent to a second CC that has previously been determined to be a text CC;

assigning a text label to the first CC to indicate that the first CC is a text CC;

assigning a potential-text label to the first CC if the first CC fails the filtering rule but is adjacent to a text CC;

assigning the potential-text label to the first CC if the first CC satisfies the filtering rule but is not adjacent to a text CC;

merging a plurality of the first CCs into a text region; and assigning the text label to the first CCs with the potential text label in the text region if the quantity of first CCs with the text label and the quantity of first CCs with the potential text label is above a threshold quantity.

10. A computer system having a processor and memory for text character identification in a binary image, the system comprising:

a connected component acquisition unit configured to acquire a plurality of connected components (CCs) in a binary image;

a limit generation unit configured to determine at least one property limit by acquiring at least one of a most common CC base width in the binary image and a most common CC base height in the binary image;

a filtering rule generation unit configured to generate a filtering rule according to the property limit; and a text determination unit configured to— determine that a CC is a text character according to the filtering rule, and because the CC is adjacent to another CC that has previously been determined to be a text character;

assign a first text label to the CC to indicate that the CC is a text character;

assign a second text label to the CC if the CC is determined not to be a text character according to the filtering rule;

merge neighboring CCs into a plurality of text regions; and determine that the CCs in any text region are not text characters if there are fewer than a predetermined number of CCs in the text region.

11. The system of claim 10, further comprising a binary image generation unit configured to convert a bitmap image to the binary image using a thresholding method.

12. The system of claim 11 wherein the binary image generation unit is configured to convert the bitmap image using a minimum error thresholding method or an Otsu thresholding method.

13. The system of claim 10 wherein the connected component acquisition unit is configured to acquire CCs using a region growing method.

14. The system of claim 13 wherein the connected component acquisition unit is configured to merge pixels to CCs when those pixels are both adjacent to the CCs and similar in property.

15. The system of claim 10 wherein the limit generation unit is further configured to determine a CC density.

16. The system of claim 14 wherein the property limit comprises an upper height limit, an upper width limit, a lower height limit, and a lower width limit.

17. The system of claim 16 wherein the limit generation unit is further configured to:

determine the upper height limit by multiplying a first weighted value by the base height or adding the first weighted value to the base height;

determine the lower height limit by dividing the base height by a second weighted value or subtracting the second weighted value from the base height;

determine the upper width limit by multiplying a third weighted value by the base width or adding the third weighted value to the base width; and determine the lower width limit by dividing the base width by a fourth weighted value or subtracting the fourth weighted value from the base width.

18. The system of claim 17 wherein the filtering rule comprises:

one of the CCs is not a text character if its height is lower than the lower height limit and its width is lower than the lower width limit; and one of the CCs is not a text character if its height is higher than the upper height limit or its width is higher than the upper width limit.

19. The system of claim 10 wherein the text determination unit is further configured to merge neighboring CCs into a plurality of text regions, and determine that the CCs in any text region are not text characters if the number of CCs is lower than a count threshold.

20. A system for text character identification, the system comprising:

means for acquiring a plurality of connected components (CCs) in a binary image;

means for determining a property limit of the CCs by acquiring either a most frequently occurring CC base height or by acquiring a most frequently occurring CC base width;

means for generating a filtering rule according to the property limit;

means for determining that the CCs satisfy the filtering rule;

means for determining that the CCs are adjacent to at least one other CC that has previously been determined to be a text character;

means for assigning a first text label to the CCs if the CCs satisfy the filtering rule and are adjacent to the other CCs that has previously been determined to be a text character;

means for assigning a second text label to each of the CCs that are determined not to satisfy the filtering rule but are adjacent to the other CC that has previously been determined to be a text character;

means for assigning the second text label to each of the CCs that are determined to satisfy the filtering rule but are not adjacent to the other CC that has previously been determined to be a text character;

means for counting the first text labels and the second text labels in a text region; and means for assigning the first text label to all CCs within the text region if the text region contains more than a threshold number of first text labels and second text labels.

21. A computer system having a processor and memory, the computer system comprising:

a filtering component configured to analyze a plurality of connected components in a binary image to determine whether the connected components satisfy a first rule and a second rule;

a text character labelling component configured to apply an affirmative-text character label to connected components that satisfy both the first and second rules, and to apply a potential-text character label to connected components that satisfy either the first rule or the second rule, but not both the first and second rules;

a text region labelling component configured to apply a text region label to a first and second connected component in the plurality of connected components if a distance between the first connected component and the second connected component is less than a predetermined threshold value; and a text character counting component configured to count connected components having the text region label and determine that a region of the binary image defined by the connected components having the text region label contains text characters if the connected components number more than a predetermined threshold value, wherein at least one of the filtering component, the text character labelling component, and the text region labelling component is configured as instructions stored in the memory for execution by the processor.

22. The computer system of claim 21 wherein the first rule comprises at least one of a height limit, a width limit, or a density limit, and wherein the second rule comprises at least one of a height limit, a width limit, or a density limit, and further wherein the first rule is different from the second rule.

23. The computer system of claim 21 wherein the text region labeling component further comprises a text region removal unit configured to determine a quantity of connected components in the text region and to remove the text region label from the text region if the quantity is less than a predetermined threshold value.

24. The computer system of claim 21 wherein the first rule comprises a filtering rule based upon at least one of height or width of the connected components, and wherein the second rule comprises a rule based on adjacency of connected components.

* * * * *

UNITED STATES PATENT AND TRADEMARK OFFICE
CERTIFICATE OF CORRECTION

| | | |
|---|---|---|
| PATENT NO. | : 8,306,325 B2 | Page 1 of 1 |
| APPLICATION NO. | : 11/142846 | |
| DATED | : November 6, 2012 | |
| INVENTOR(S) | : Chang | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1068 days.

Signed and Sealed this
Twenty-ninth Day of December, 2015

Michelle K. Lee
*Director of the United States Patent and Trademark Office*